(12) United States Patent
Christoffersson et al.

(10) Patent No.: US 11,038,563 B2
(45) Date of Patent: Jun. 15, 2021

(54) METHOD AND APPARATUS FOR GROUP TRANSMISSIONS FROM MULTIPLE USERS TO A MOBILE TELECOMMUNICATIONS NETWORK

(71) Applicant: Telefonaktiebolaget LM Ericsson (publ), Stockholm (SE)

(72) Inventors: Jan Christoffersson, Luleå (SE); Mårten Ericson, Luleå (SE); Magnus Thurfjell, Luleå (SE); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 72 days.

(21) Appl. No.: 16/314,904

(22) PCT Filed: Jul. 15, 2016

(86) PCT No.: PCT/EP2016/066950
§ 371 (c)(1),
(2) Date: Jan. 3, 2019

(87) PCT Pub. No.: WO2018/010818
PCT Pub. Date: Jan. 18, 2018

(65) Prior Publication Data
US 2019/0312616 A1    Oct. 10, 2019

(51) Int. Cl.
*H04B 7/0456* (2017.01)
*H04B 7/0404* (2017.01)
(Continued)

(52) U.S. Cl.
CPC ........... *H04B 7/0456* (2013.01); *H04B 7/026* (2013.01); *H04B 7/0404* (2013.01);
(Continued)

(58) Field of Classification Search
CPC .... H04B 7/0456; H04B 7/026; H04B 7/0404; H04B 7/0452; H04B 7/0617; H04L 25/0226; H04L 5/0051
See application file for complete search history.

(56) References Cited

U.S. PATENT DOCUMENTS

| 2014/0177461 A1* | 6/2014 | Seyedmehdi ....... H04W 72/085 370/252 |
| 2014/0211734 A1 | 7/2014 | Seo et al. |

(Continued)

FOREIGN PATENT DOCUMENTS

| KR | 20140144180 A | 12/2014 |
| KR | 101590488 B1 | 2/2016 |

(Continued)

OTHER PUBLICATIONS

Dahlman, E. et al., "4G LTE/LTE—Advanced for Mobile Broadband", Jan. 1, 2011, pp. 1-431, Academic Press is an imprint of Elsevier, US.

*Primary Examiner* — Zhensheng Zhang
(74) *Attorney, Agent, or Firm* — Coats & Bennett, PLLC

(57) ABSTRACT

Methods and devices are proposed for enabling group transmission of data from a group of devices to a base station of a mobile telecommunications network. In order to enable beamforming for each of the group of devices, a plurality of unique antenna identifiers is assigned to each transmit antenna of the devices forming the beamforming group. The antenna identifiers are communicated to the base station. Each device of the beamforming group then transmits sounding reference signals to the base station with each transmit antenna identified with a unique identifier. The individual devices then receive respective beamforming precoding information, for each antenna identified with the unique antenna identifier, generated in response to a respective sounding reference signal from the base station. The (Continued)

devices then utilize the respective precoding information to transmit data to the base station as part of a joint beamforming transmission from the group of devices.

12 Claims, 5 Drawing Sheets

(51) Int. Cl.
- *H04B 7/0452* (2017.01)
- *H04B 7/06* (2006.01)
- *H04L 5/00* (2006.01)
- *H04L 25/02* (2006.01)
- *H04B 7/026* (2017.01)

(52) U.S. Cl.
CPC ......... *H04B 7/0452* (2013.01); *H04B 7/0617* (2013.01); *H04L 5/0051* (2013.01); *H04L 25/0226* (2013.01)

(56) References Cited

U.S. PATENT DOCUMENTS

| | | | |
|---|---|---|---|
| 2014/0313897 A1* | 10/2014 | Oh | H04B 7/024 370/235 |
| 2015/0043474 A1 | 2/2015 | Takeda et al. | |
| 2015/0146812 A1 | 5/2015 | Chu et al. | |

FOREIGN PATENT DOCUMENTS

| | | |
|---|---|---|
| WO | 2015163798 A1 | 10/2015 |
| WO | 2016128847 A1 | 8/2016 |

\* cited by examiner

METHOD AND APPARATUS FOR GROUP TRANSMISSIONS FROM MULTIPLE USERS TO A MOBILE TELECOMMUNICATIONS NETWORK

TECHNICAL FIELD

The present invention relates to the group transmission of data from a plurality of devices, such as user equipments, UE, to a mobile communication network. More particularly the invention pertains to improvements in the attainable bit rate and coverage when performing uplink group transmissions.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

A scheme that is proposed for 4G LTE Advanced is direct communication between devices, or UEs, a mechanism termed device-to-device, or D2D communication. LTE 2D2 is a peer to peer link which does not use the mobile network infrastructure, but enables LTE based devices to communicate directly with one another when they are in close proximity.

Proposals have been made to exploit this concept to increase the uplink coverage for an individual UE by enabling a group of UEs to operate as an antenna array and transmit synchronised data in a group. WO 2015/163798 describes a scheme wherein an individual UE wishing to transmit data to a base station of a mobile telecommunications network initially transmits data to other UEs in a group. All UEs in the group then transmit the same data jointly to the network using a group ID.

The advantage of uplink group transmission is that the signal-to-interference-plus-noise ratio, SINR for each UE in the group is added, i.e. where the SINR of an uplink transmission for a single UE is $SINR_{singletx}$ the SINR for the group transmission is $SINR_{grouptx}$ can be expressed as follows when the number of UEs in the group is GroupSize:

$$SINR_{grouptx} = \sum_{u}^{GroupSize} SINR_{singletx}(u)$$

This is especially beneficial when the SINR is low in a particular area or when the UE desiring to send the data has a low SINR or is even out of UL coverage and the other UEs in the group have a higher SINR. The SINR from the group transmission is typically considerably higher than for an individual UE within the group.

The use of a single identifier or group ID to identify all group transmissions means that the network sees the group as a single UE transmitting from different points. The network uses conventional signaling for a single UE towards the group. One UE within the group acts as a coordinator to relay this signaling to the other group members. Control signaling between the network and the group is also performed by the coordinating UE Beamforming (BF) is a well-known technique for increasing uplink coverage and bit rates. Beamforming uses multiple antennas to control the direction of a wave front by appropriately weighting the magnitude and phase of individual antenna signals. In case of highly correlated transmit antennas (small inter-antenna distance) different phase shifts of the transmitted signals can improve the signal strength at the receiver by forming a beam in the target direction. With higher antenna separation (or cross polarized antennas) adjusting also the relative amplitude (power) of the transmitted signals can also compensate for fading differences between the transmitting antennas.

Beamforming can be applied in both 3G and 4G mobile telecommunication systems. The standardized schemes are typically closed-loop: a base station performs a channel estimation for the signals from each transmit antenna used by a UE. Dedicated uplink pilots or reference symbols can be used as beamforming training sequences by the UE to facilitate this. The base station then provides feedback to UE, indicating which precoding weighting or vector to use.

Beamforming is also known in other networks technologies. US 2015/0146812 describes the application of beamforming in a wireless local area network in which an access point uses beamforming to transmit different data streams to group of terminals simultaneously and also receives different data streams from the group of terminals simultaneously. The access point prompts the terminals to transmit beamforming training packets and then sends respective beamforming feedback packets in return. On the basis of the beamforming training packets received from each terminal, the access point selects which terminals may transmit simultaneously.

In LTE, the network orders the terminals to send a sounding signal called Sounding Reference Symbol (SRS). Multiple SRS can be multiplexed together using the same frequency, bandwidth and symbol. This can be done either by using different "combs" (2 "combs" or Orthogonal cover codes, OCC, can be used) or 8 different cyclic shifts. In total up to 16 different antennas can be multiplexing on the same SRS.

Applying conventional beamforming schemes is problematic when using group transmissions initiated by UEs, i.e. when the network is not aware of the number or location of UEs participating in a group transmission. This is because there are no feedback channels to the individual UEs of the group. Estimating an optimal precoding vector from the signal received jointly from all UEs in the group would almost certainly limit the gain, as any single precoding vector is likely to be favourable for only a small subset of the group.

It is an object of the present invention to provide methods and devices that alleviate or eliminate one or more of the above-identified disadvantages in the prior art.

It is a further object of the present invention to provide methods and devices that enable an improved user bit rate and uplink coverage for uplink group transmissions in a mobile telecommunication system.

SUMMARY

The above and further objects are achieved according to an aspect of the present invention in a method of transmitting data from a group of devices to a base station of a mobile telecommunications network. The method includes assigning a unique antenna identifier to each transmit antenna of a plurality of devices forming a beamforming group of devices. The method further comprises informing the base station of the unique antenna identifiers of the beamforming group. The method comprises each device of the beamforming group transmitting sounding reference signals to the base station with each transmit antenna identified with a unique identifier. Each device receiving from the base station respective beamforming precoding information, for each antenna identified with the unique antenna identifier. The precoding information is generated in response to a respective sounding reference signal. The method further comprises each device utilizing the precoding information to transmit data to the base station in a beamforming transmission as part of a joint beamforming transmission from the beamforming group of devices.

By assigning unique identifiers to the transmit antennas in the beamforming group and communicating these to the base station, the network can view the beamforming group as a single multi-antenna device. Beamforming training packets in the form of sounding reference signals transmitted by each individual UE device of the can thus be associated with the identified transmit antennas and adapted beamforming feedback generated and transmitted in the form of beamforming precoding information specific to each respective device of the beamforming group. The resulting signal strength is enhanced not only because each device is able to perform beamforming in a manner that is optimal for the target base station, but additionally the precoding information can be adapted such that the aggregated number of antennas from all devices in the beamforming group serve as an antenna array with beamforming for the whole array. Thus, even if each device has a limited number of antennas, the uplink beamforming group transmission can achieve significant SINR gains.

In accordance with a further aspect, the above objects are achieved in a method in a first device for transmitting data wirelessly to a base station of a mobile telecommunications network. The method includes assigning a unique antenna identifier to each transmit antenna comprised in devices of a beamforming group, where the beamforming group consists of a plurality of devices including the first device. The method further comprises communicating the unique antenna identifiers to the other devices of the beamforming group and to the base station and sending a sounding reference signal to the base station with antennas of the first device identified by the antennas identities. The method further comprises receiving beamforming precoding information from the base station, where the beamforming precoding information relates at least to the first device and utilizing the beamforming precoding information to transmit data to the base station in a beamforming transmission as part of a joint transmission of the data by a plurality of devices of the beamforming group.

The step of sending a sounding reference signal to the base station may include sending the sounding reference signal as part of a multiplexed sounding reference signal sent simultaneously with other devices of the beamforming group.

Alternatively, the step of sending a sounding reference signal to the base station may include sending the sounding reference signal in a designated time slot.

The step of receiving beamforming precoding information from the base station may include receiving precoding information relating to a plurality of devices of the group.

The method may further include transmitting a designated timeslot to each of the other devices of the beamforming group prior to sending the sounding reference signal.

Prior to assigning a unique antenna identifier to the transmit antennas of each device of the beamforming group, the method may include determining the number of transmit antennas comprised in the devices of the beamforming group.

The method may include establishing the beamforming group prior to assigning antenna identifiers to the transmit antennas.

In accordance with one embodiment, the devices forming part of the beamforming group may be selected on the basis of downlink measurements received from the devices. Alternatively, the devices for the beamforming group may be selected on the basis of the distance between devices.

The method may include communicating with other devices by means of a device-to-device technique used in the mobile telecommunications network.

In accordance with one embodiment, the beamforming group is a sub-group of a larger group of devices established for joint group transmission to the base station.

According to a further aspect, the above objects are achieved in a method in a device for transmitting data to a base station of a mobile telecommunications network. The method includes receiving assigned antenna identifiers for transmit antennas comprised in the device from a coordinating device and sending a sounding reference signal to the base station with antennas identified by the antenna identifiers. The method further comprises receiving beamforming precoding information and utilizing the beamforming precoding information to transmit data to the base station in a beamforming transmission as part of a joint transmission of the data by a beamforming group, where the beamforming group comprises a plurality of devices including the device and the coordinating device.

The method may include prior to receiving the assigned antenna identifiers, communicating the number of transmit antennas comprised in the device to the coordinating device.

According to a still further aspect, the above objects are achieved in a first device configured for transmitting data to a base station of a mobile telecommunications network, the device being further configured to: assign a unique antenna identifier to each transmit antenna comprised in devices of a beamforming group, the beamforming group consisting of a plurality of devices including the first device, communicate the unique antenna identifiers to the other devices of the beamforming group and to the base station, send a sounding reference signal to the base station with the transmit antennas of the first device identified by said antenna identifiers, receive beamforming precoding information from the base station, the beamforming precoding information relating to at least the first device, utilize the beamforming precoding information to transmit data to the base station in a beamforming transmission as part of a joint transmission of the data by the beamforming group.

According to an aspect, the above objects are achieved in a device configured for transmitting data to a base station of a mobile telecommunications network, the device being further configured to: receive antenna identifiers assigned to transmit antennas comprised in the device from a coordinating device, send a sounding reference signal to the base station with the transmit antenna of the device identified by said antenna identifiers, receive beamforming precoding information and utilize the beamforming precoding information to transmit data to the base station in a beamforming transmission as part of a joint transmission of the data by a beamforming group, the beamforming group comprising a plurality of devices including the device and the coordinating device.

According to another aspect, the above objects are achieved in a device configured for transmitting data to a base station of a mobile telecommunications network, said device comprising: an assigning module for assigning a unique antenna identifier to each transmit antenna comprised in devices of a beamforming group, the beamforming group consisting of a plurality of devices including the first device, a first communicating module for communicating the unique antenna identifiers to the other devices of the beamforming group and to said base station, a sending module for sending a sounding reference signal to said base station, a receiving module for receiving beamforming precoding information from said base station, said beamforming precoding information relating to at least one devices of said beamforming group, a utilizing module for utilizing said beamforming precoding information to transmit data to said base station in a beamforming transmission as part of a joint beamforming transmission of said data by the beamforming group.

According to a still further aspect, the above objects are achieved in a device configured for transmitting data to a base station of a mobile telecommunications network, the device comprising: a first receiving module for receiving assigned antenna identifiers for transmit antennas comprised in the device from a coordinating device, a sending module for sending a sounding reference signal to the base station, a second receiving module for receiving beamforming precoding information and a utilizing module for utilizing the beamforming precoding information to transmit data to the base station in a beamforming transmission as part of a joint beamforming transmission of the data by a beamforming group, the beamforming group consisting of a plurality of devices including the device and the coordinating device.

BRIEF DESCRIPTION OF THE DRAWINGS

The foregoing will be apparent from the following more particular description of example embodiments as illustrated in the accompanying drawings, in which like reference characters refer to the same parts throughout the different views. The drawings are not necessarily to scale, emphasis instead being placed upon illustrating the example embodiments.

DETAILED DESCRIPTION

Figure 1:
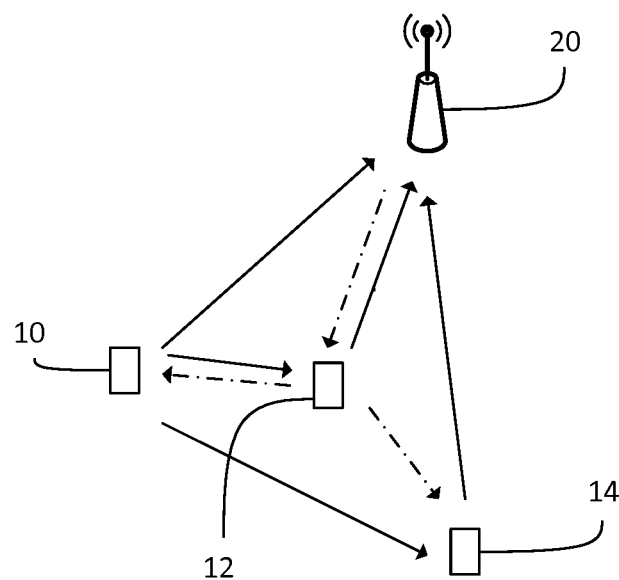
FIG. 1 schematically illustrates part of a mobile telecommunications network according to an aspect of the invention, FIG. 2 schematically illustrates part of a mobile telecommunications network configured for group beamforming transmissions in accordance with an aspect of the present invention, FIG. 3 schematically illustrates a base station and several devices in accordance with aspects of the invention.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

In some embodiments described below data is transmitted jointly as a group transmission from a group of devices to a base station of a mobile telecommunications network. A unique antenna identifier is assigned to each transmit antenna of a plurality of devices forming a beamforming group of devices; such that each transmit antenna within the beamforming group of devices has a unique antenna identifier. Each unique antenna identifier is unique within the group of beamforming devices. Within the same cell there may co-exist multiple beamforming groups of devices. In some examples the antenna identifiers which are unique to one beamforming group of devices may occur in another beamforming group within the same cell. The base station is informed of the antenna identifiers of all transmit antennas of the beamforming group. Each device of the beamforming group then transmits sounding reference signals to the base station with each transmit antenna identified with a unique identifier. Each device subsequently receives from the base station respective beamforming precoding information, for each antenna identified with the unique antenna identifier, generated in response to a respective sounding reference signals. Each device then utilizes the precoding information to transmit data to the base station in a beamforming transmission as part of a joint beamforming transmission from the beamforming group of devices.

In some embodiments described below a first device transmits data wirelessly to a base station of a mobile telecommunications network. The first device assigns a unique antenna identifier to each transmit antenna comprised in devices of a beamforming group, the beamforming group consisting of a plurality of devices including the first device. The first device further communicates the unique antenna identifiers to the other devices of the beamforming group and to the base station. The first device sends a sounding reference signal to the base station with antennas of the first device identified by the antennas identifiers and receives beamforming precoding information from the base station, the beamforming precoding information relating at least to the first device. The first device utilizes the beamforming precoding information to transmit data to the base station in a beamforming transmission as part of a joint transmission of the data by a plurality of devices of the beamforming group.

In embodiments described below a device transmits data to a base station of a mobile telecommunications network. The device receives assigned antenna identifiers for transmit antennas comprised in the device from a coordinating device and sends a sounding reference signal to the base station with antennas identified by the antenna identifiers. The device then receives beamforming precoding information. The beamforming precoding may be received from the base station directly or via the coordinating device. The device utilizes the beamforming precoding information to transmit data to the base station in a beamforming transmission as part of a joint transmission of the data by a beamforming group. The beamforming group comprising a plurality of devices including the device and the coordinating device.

In further embodiments described below a first device is configured for transmitting data to a base station of a mobile telecommunications network, the device being configured to assign a unique antenna identifier to each transmit antenna comprised in devices of a beamforming group, the beamforming group consisting of a plurality of devices including the first device. The device is further configured to communicate the unique antenna identifiers to the other devices of the beamforming group and to the base station, send a sounding reference signal to the base station with the transmit antennas of the first device identified by the antenna identifiers, receive beamforming precoding information from the base station, the beamforming precoding information relating to at least the first device, and utilize the beamforming precoding information to transmit data to the base station in a beamforming transmission as part of a joint transmission of the data by the beamforming group.

In still further embodiments described below a device is configured for transmitting data to a base station of a mobile telecommunications network, the device being adapted to receive antenna identifiers assigned to transmit antennas comprised in the device from a coordinating device, send a sounding reference signal to the base station with the transmit antenna of the device identified by the antenna identifiers, receive beamforming precoding information and utilize the beamforming precoding information to transmit data to the base station in a beamforming transmission as part of a joint transmission of the data by a beamforming group, the beamforming group comprising a plurality of devices including the device and the coordinating device.

In some embodiments described below a device is configured for transmitting data to a base station of a mobile telecommunications network. The device comprises an assigning module for assigning a unique antenna identifier to each transmit antenna comprised in devices of a beamforming group, the beamforming group consisting of a plurality of devices including the first device. The device further comprises a first communicating module for communicating the unique antenna identifiers to the other devices of the beamforming group and to the base station, a sending module for sending a sounding reference signal to the base station, a receiving module for receiving beamforming precoding information from the base station, the beamforming precoding information relating to at least one devices of the beamforming group, a utilizing module for utilizing the beamforming precoding information to transmit data to the base station in a beamforming transmission as part of a joint beamforming transmission of the data by the beamforming group.

In some embodiments described below a device is configured for transmitting data to a base station of a mobile telecommunications network. The device comprises a first receiving module for receiving assigned antenna identifiers for transmit antennas comprised in the device from a coordinating device, a sending module for sending a sounding reference signal to the base station, a second receiving module for receiving beamforming precoding information and a utilizing module for utilizing the beamforming precoding information to transmit data to the base station in a beamforming transmission as part of a joint beamforming transmission of the data by a beamforming group, where the beamforming group consists of a plurality of devices including the device and the coordinating device.

FIG. 1 shows part of a mobile telecommunications network including a base station 20 and user equipment (UE) devices 10, 12, 14. It will be appreciated that in reality the mobile telecommunications network may have more base stations and that many more UE devices can communicate with the illustrated base stations or other base stations as well as other UE devices.

The base station 20 forms part of a radio access network of the mobile telecommunications network and may take the form of an eNodeB when the mobile network is a Long Term Evolution (LTE) network. But the invention is not limited to this, and other wireless systems, including WCDMA, WiMax, UMB and GSM, may also benefit from the example embodiments disclosed herein.

The UE devices 10, 12, 14 communicate wirelessly with the base station 20 and may include any portable UE devices such as mobile phones or the like or fixed terminals having mobile telecommunication connectivity.

Figure 3:
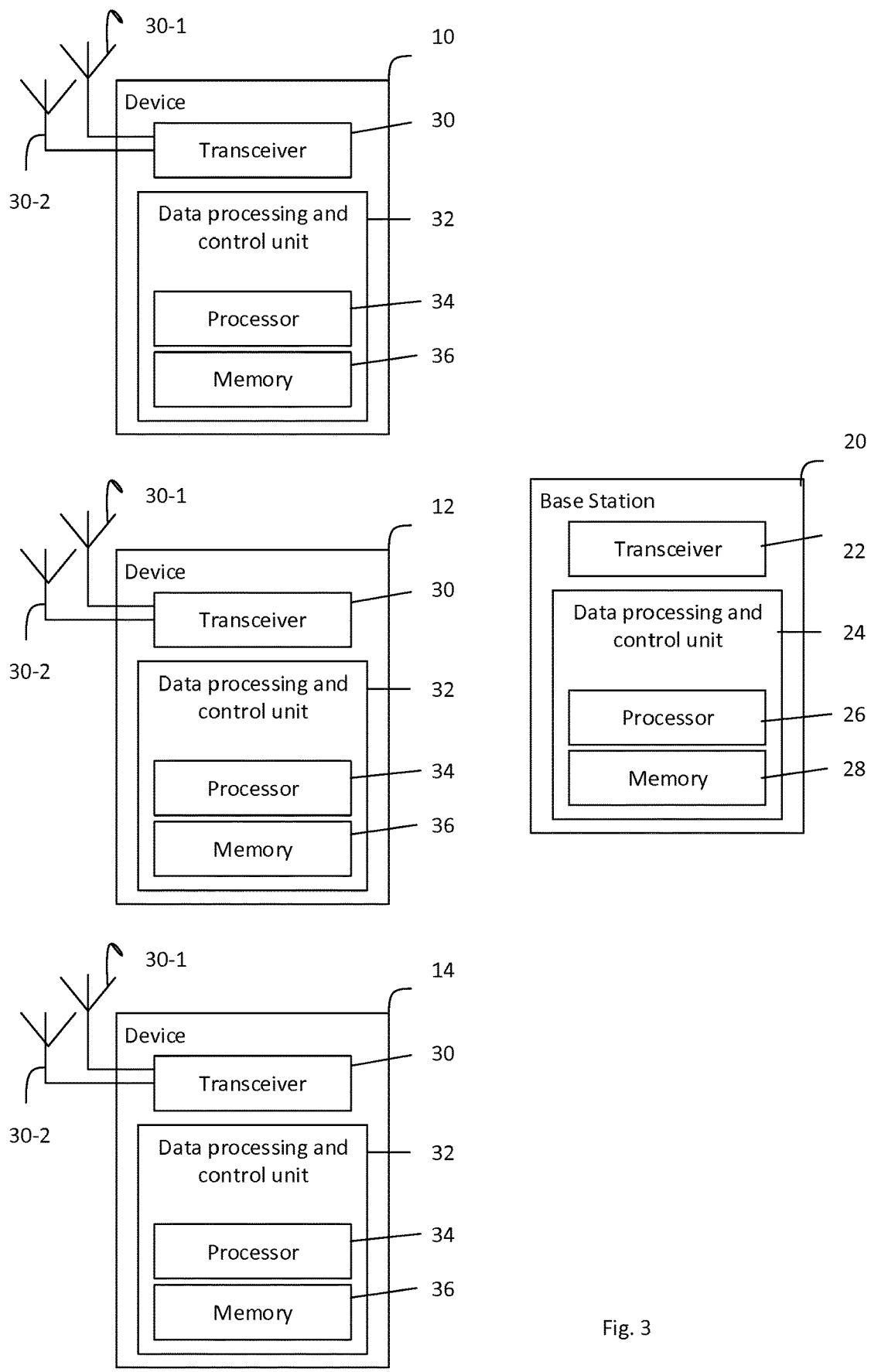

FIG. 3 illustrates the base station 20 and UEs 10, 12, 14 in more detail. Base station 20 includes a transceiver module 22 and a data processing and control unit module 24. The transceiver module 22 comprises the components necessary for communication with the core network of the mobile telecommunications network as well as for communicating with multiple devices over a wireless interface. To that end it may include any number of transceiving, receiving, and/or transmitting units or circuitry. It should further be appreciated that the transceiver module 22 may be in the form of any input/output communications port known in the art and may comprise RF circuitry and baseband processing circuitry.

The data processing and control module 24 includes a processor 26 and a memory 28. The memory 28 stores instructions, in the form of a computer program, for causing the processor 26 to carry out the steps described herein. The computer program may be installed in the memory 28 prior to the base station being put into operation or alternatively be downloaded subsequently as a separate application. The memory 28 may be configured to store received or transmitted data and/or executable program instructions as well as any form of beamforming information, reference signals, and/or feedback data or information. The memory 28 may be any suitable type of computer readable memory and may be of volatile and/or non-volatile type. The processor 26 may be any suitable type of computation unit, e.g. a microprocessor, digital signal processor (DSP), field programmable gate array (FPGA), or application specific integrated circuit (ASIC) or any other form of circuitry. It should be appreciated that the processor 26 need not be provided as a single unit but may be provided as any number of units.

The user equipment devices 10, 12 and 14 are identical in all essential respects for the purposes of the present disclosure and thus only one, namely, the UE device 10 will be described here.

UE device 10 comprises a transceiver module 30 and a data processing and control module 32. The transceiver module 30 comprises the components necessary for communication with base station 20 and other base stations of the mobile telecommunications network over a wireless interface and using a suitable communications protocol.

Among these components are several transmit antennas, 30-1, 30-2, via which the UE device 10 may transmit signals towards the base station 20 or other UE devices 10, 14. It will be understood that while only two transmit antennas 30-1, 30-2 are shown, the UE devices may have more transmit antennas, possibly up to 16 or more. The transceiver module may also comprise components necessary for direct communication with at least one other device, such as the illustrated devices 12, 14, using a suitable communications protocol. One such protocol is the Device-to-Device (D2D) short-range communications protocol specified in LTE. It will be understood that the transceiver module 30 may comprise suitable transceiving, receiving, and/or transmitting units or circuitry and comprise RF circuitry and baseband processing circuitry.

The data processing and control module 32 includes a processor 34 and a memory 36. The memory 36 stores instructions, in the form of a computer program, for causing the processor 34 to carry out the steps described herein. The computer program may be installed in the memory 36 prior to the device being put into operation or alternatively be downloaded subsequently as a separate application. The memory 36 may also be configured to store any form of beamforming information, reference signals, and/or feedback data or information and may be any suitable type of computer readable memory and may be of volatile and/or non-volatile type. The processor 34 may be configured to perform measurements and set configurations provided by the base station 20. The processor 34 may comprise any suitable type of computation unit, e.g. a microprocessor, digital signal processor (DSP), field programmable gate array (FPGA), or application specific integrated circuit (ASIC) or any other form of circuitry. It should be appreciated that the processor 34 need not be provided as a single unit but may be provided as any number of units or circuitry elements.

Referring again to FIG. 1, the UE devices 10, 12, 14 are configured to operate as a group for uplink transmission in order to increase coverage and user bit rate. In essence, the group of UE devices may operate as a single antenna array to transmit the same data in a synchronised manner or alternatively by the spatial multiplexing of transmissions between the different devices 10, 12, 14 of the group. In both cases, one UE device acts as a group coordinator or master device. In the illustrated example this is device 12. The coordinating UE device 12 receives all downlink signalling from the base station 20 for the group and relays this as necessary to the other members of the group as shown by the dash-dotted arrows. The coordinating user equipment device 12 also assures the necessary control signalling for the group, such as the Channel Quality Indicator (CQI), Hybrid Automatic Repeat Request (HARQ) and ACK/NACK mechanisms and the like. All the UE devices operating in the group use the same user identification or group identifier. The network, and specifically base station 20 thus views the group as a single UE device.

When one UE device wants to send data, but due to bad network coverage, or possibly in a bid to increase user bit rate, desires to send data as part of a group of UE devices, it sends this data to the other UE devices in the group. In the illustrated arrangement UE device 10 sends data to UE devices 12 and 14 as illustrated by solid arrows in FIG. 1, and all UE devices 10, 12, 14 subsequently transmit the same data synchronously. This group transmission is perceived by the base station 20 as a transmission from a single UE device.

Communication between devices may be carried out using any wireless communications technology that is outside the mobile telecommunications network. In the case of an LTE network, the devices might communicate using the LTE Device-to-Device (D2D) communication service that enables communication between user equipment devices when these are in proximity to one another. Alternatively any, preferably short-range, communication system outside of the mobile telecommunications network may be utilised via which the UE devices 10, 12, 14 may communicate directly or indirectly with other members of the group.

When communicating with the base station 20, the UE devices 10, 12, 14 employ beamforming to steer or focus transmissions in the target direction and so improve signal strength at the receiver. In many mobile telecommunication technologies, including LTE, the weighting of magnitude and phase required to direct transmissions optimally is signalled to each UE device 10, 12, 14 in a precoding vector by the base station 20 to which the UE device is connected. The precoding vector is identified using codewords that relate to a defined codebook or table of precoding matrices known to both sides. The base station can determine the optimal precoding vector based on a beamforming training packet sent by the UE device in question. In LTE the beamforming training packet is a Sounding Reference Signal (SRS). A UE device can multiplex sounding reference signals from different transmit antennas on the same symbol forming a single sounding reference packet.

However, when a plurality of devices are operating in group transmission mode as illustrated in FIG. 1, all control signalling between the group and the base station 20 is conducted by the group coordinator UE device 12. The base station 20 will thus generate a precoding vector adapted to optimally direct the transmission of this coordinating UE device 12. However, the location and orientation of the different UE devices 10, 12, 14 means that this precoding vector is unlikely to be optimal for all devices of the group and in some cases may even result in the signal strength being reduced compared to a transmission without beamforming. However, in the closed-loop beamforming schemes such as specified for LTE, there is no mechanism for assessing the suitability of a precoding vector as all channel estimation is performed by the base station 20.

Figure 2:
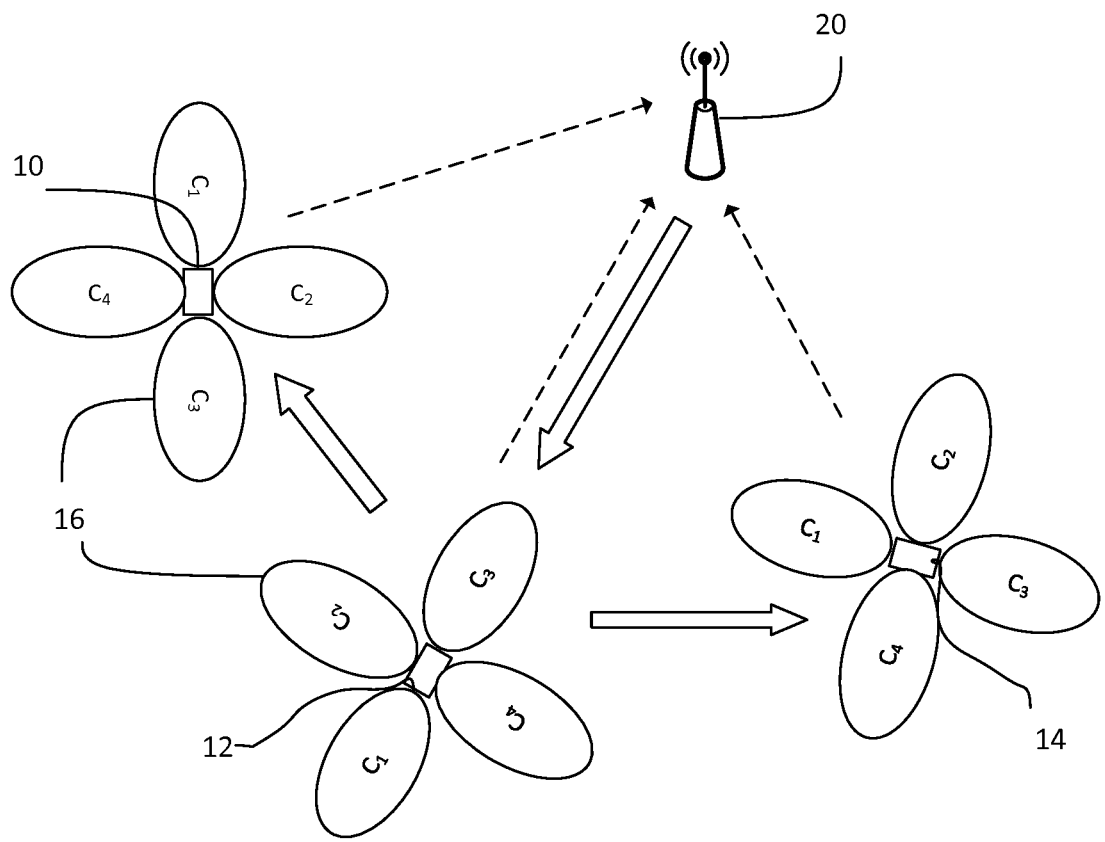
Figure 4:
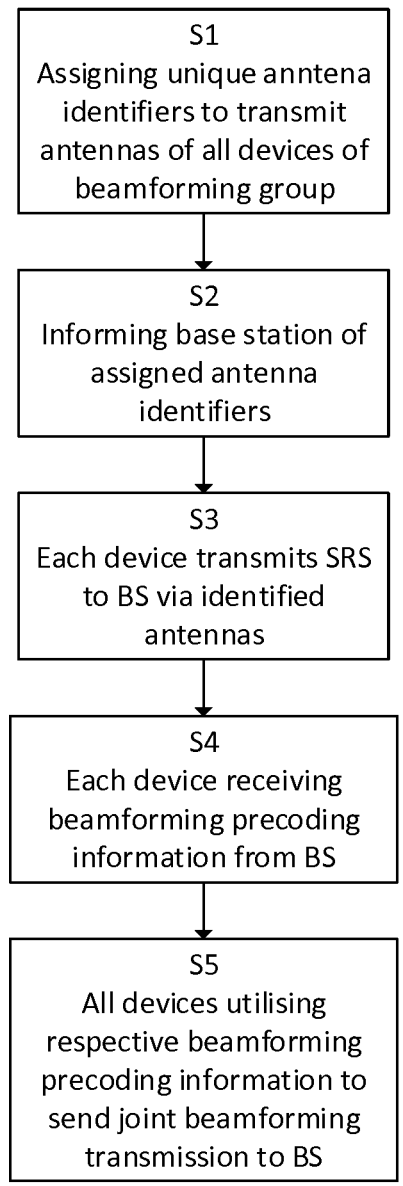
FIG. 4 is a flow diagram illustrating a method performed by user equipment devices of a beamforming group according to an aspect of the present invention.
Figure 5:
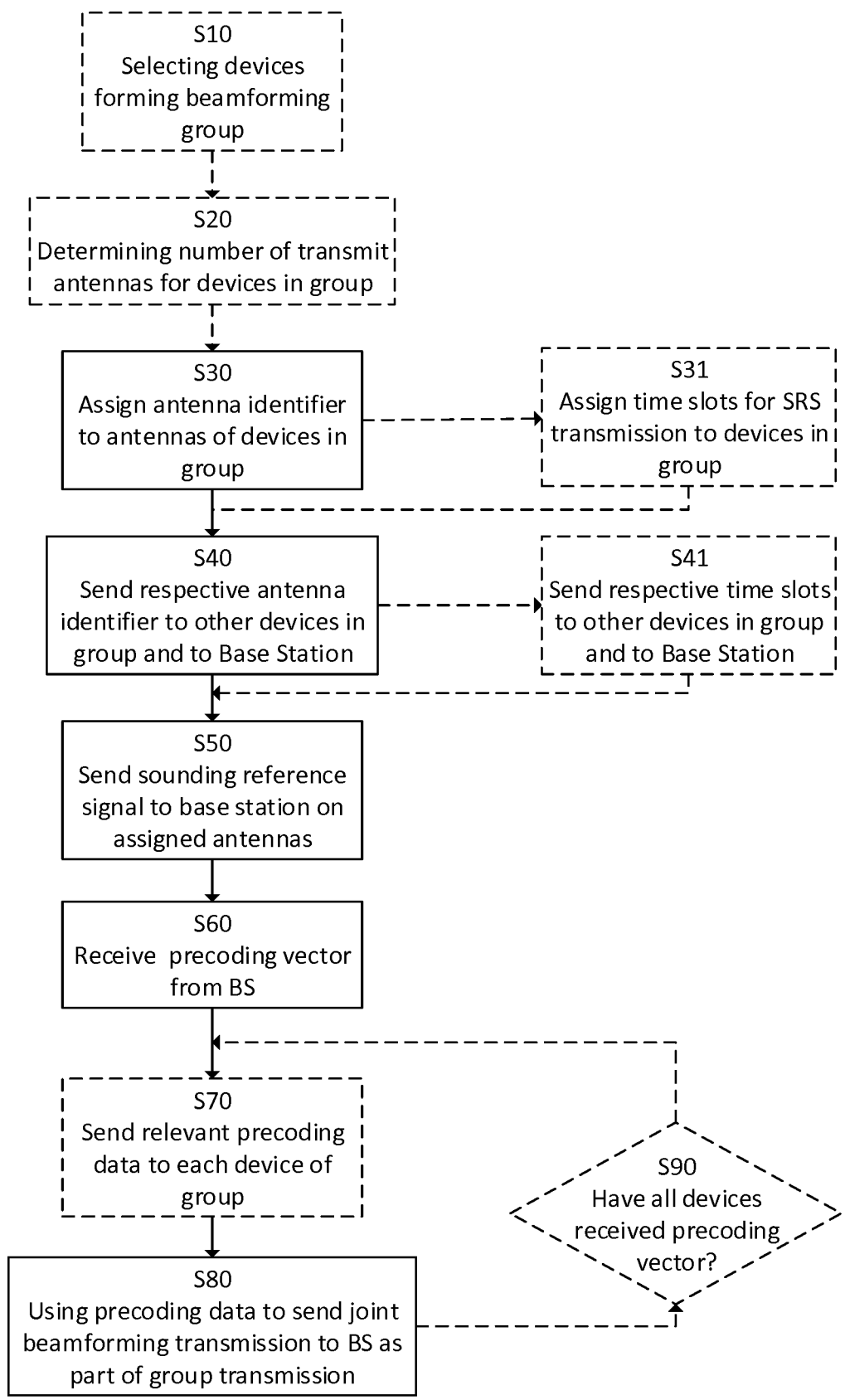
FIG. 5 is a flow diagram illustrating a method performed in a first user equipment device in accordance with an aspect of the present invention.
Figure 6:
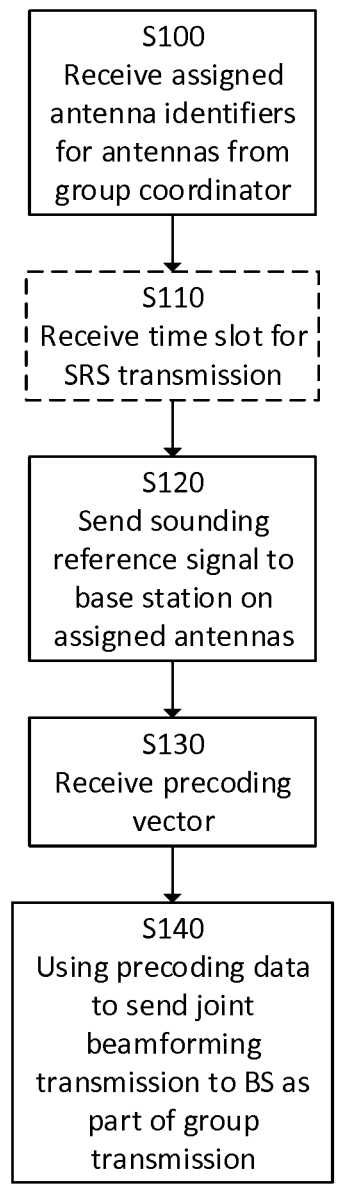
FIG. 6 is a flow chart illustrating a method performed in a second user equipment device in accordance with a further aspect of the invention.

This drawback is alleviated as illustrated schematically in FIG. 2 and in the flow charts of FIGS. 4 to 6.

FIG. 2 illustrates the same group of UE devices 10, 12, 14 and the base station 20 shown in FIG. 1. As shown in the figure, each UE device 10, 12, 14 generates beams 16 determined by precoding information received from the base station 20 but also the disposition and orientation of the transmit antennas 30-1, 30-2. In the illustrated example, each UE device is capable of generating four beams 16 based on precoding data $C_1$, $C_2$, $C_3$ and $C_4$. However, it is apparent that the same precoding data is not favourable for all UE devices 10, 12, 14. For example, precoding vector $C_2$ is optimal for UE device 10, while $C_3$ provides optimal beamforming for UE device 12 and $C_1$ an optimal beam for UE device 14. Accordingly, rather than the base station 20 estimating the channel based only on signals from the UE device 12, the base station 20 receives separate beamforming sounding reference signals from each UE device 10, 12, 14 individually and in response generates optimal precoding data for the transmit antennas 30-1, 30-2 of each UE device. As a result, the individual UE devices 10, 12, 14 are able to apply the adapted precoding vector in order to generate optimal beamforming when performing a group transmission. The group is thus a beamforming group, as every UE device 10, 12, 14 within the group performs beamforming.

This is achieved by each transmit antenna 30-1, 30-2 in the UE devices making up the beamforming group being assigning a unique identifier within the beamforming group. This assignment is performed by the group coordinator or coordinating UE device 12. The other UE devices 10, 14 in the beamforming group must first communicate the number of (active) transmit antennas 30-1, 30-2 present in each device. The coordinating UE device 12 then communicates the respective assigned antenna identifiers to each UE device and to the base station 20. Taking as an example, the three UE devices 10, 12, 14 illustrated in FIG. 3, the coordinating UE device 12 receives notification from UE devices 10 and 14 of the two transmit antennas 30-1, 30-2 present in each device. The coordinating UE device 12 also has two transmit antennas 30-1, 30-2 and hence assigns one of six unique identities to each antenna, for example: identities $A_1$, $A_2$, to the transmit antennas 30-1, 30-2 or UE device 10; antenna identities $A_3$, $A_4$ to the transmit antennas 30-21, 30-2 of UE device 12; and antenna identities $A_5$, $A_6$ to the transmit antennas 30-1, 30-2 of UE device 14.

It should be appreciated that a transmit antenna as discussed here may consist of one or more antenna elements. Additionally, while in the example embodiment each UE device 10, 12, 14 is composed of two transmit antennas, some or all devices may have more than two transmit antennas.

The base station views the uniquely identified transmit antennas as a single antenna array belonging to a single UE device. Each UE device, including the coordinating UE device, 10, 12, 14 then sends a beamforming training signal in the form of a sounding reference signal that identifies the respective antenna identities to the base station 20 as illustrated by the dashed arrows in FIG. 2.

The antenna identities may be virtual antenna port numbers.

The base station 20 determines the appropriate precoding vector for each transmit antenna 30-1, 30-2 of each UE device 10, 12, 14 in the beamforming group and sends this to the beamforming group. The precoding vector may be identified by a codeword that refers to a table of precoding vectors or matrices known to the base station 20 and the UE devices 10, 12, 14.

The precoding vector may be a single vector containing precoding information for all identified antennas, i.e. to the six transmit antennas of the illustrated example, in which case the group coordinating UE device 12 receives this and distributes the relevant precoder parts to the other UE devices 10, 14 of the beamforming group, as illustrated by the block arrows in FIG. 2.

Alternatively, individual precoding vectors adapted to the respective identified transmit antennas or to the multiple transmit antennas of individual UE devices may be received by each UE device 10, 12, 14 of the beamforming group.

The beamforming training packet or sounding reference signal may be transmitted simultaneously by all UE devices 10, 12, 14 of the beamforming group in a manner similar to that provided for individual UE devices with multiple transmit antennas in LTE networks.

More specifically, the sounding reference signals of the multiple UE devices 10, 12, 14 may be multiplexed on the same sub-frame as each UE device 10, 12, 14 transmits the same symbol and using the same frequency bandwidth and assigns them to different frequency shifts or "combs", in which case two "combs" or Orthogonal Cover Codes (OCC) can be used. Alternatively different cyclic shifts can be used.

When a multiplexed sounding reference signal is sent to the base station 20, the base station may generate a single, multi-antenna precoding vector containing weighting information for all identified transmit antennas in the beamforming group, i.e. to the six transmit antennas of the illustrated example. In this case, the precoding vector is received by the group coordinating UE device 12. The coordinating UE device 12 then distributes the relevant precoder parts to the other UE devices 10, 14 of the beamforming group, as illustrated by the block arrows in FIG. 2.

Alternatively, the sounding reference signal can be sent in a time-multiplexed manner, with each UE device 10, 12, 14 transmitting the beamforming training packet in an assigned time slot separately. The coordinating UE device 12 may assign the time slot to each UE device 10, 12, 14 of the beamforming group and likewise may inform the base station 20 of the scheme used. The base station 20 may respond to each individual sounding reference signal with a corresponding precoding vector. The precoding vector may be received by the coordinating UE device 12, which then relays this to the corresponding UE device 10, 14. Alternatively, the precoding vector may be received directly by the corresponding UE device 10, 14. Once it has received the corresponding precoding vector, each UE device 10, 14 may implement the adjustments to generate the appropriate beamforming.

The base station 20 is able to correctly assign a received sounding reference signal to one of the identified antennas by virtue of the timeslot, frequency or code used by the UE devices 10. In doing this, the base station 20 may use a pre-agreed convention between the base station 20 and UE devices 10, 12, 14 whereby the antenna identifiers or port numbers are allocated specific timeslots, frequencies or codes. For example, when the antenna identifiers are virtual antenna ports identified by consecutive port numbers, both base station 20 and UE devices 10, 12, 14 know that specific antenna port numbers will always occupy a specific timeslot, frequency or code. Alternatively, the scheme to be used may be communicated to the base station 20 by the coordinating UE device 12, for example when transmitting the antenna identifiers. The scheme will also be predefined within the beamforming group of UE devices, or be decided by one of the UE devices, such as the coordinating UE device 12.

The coordinating UE device 12 informs the base station 20 of the scheme to be used for transmitting the sounding reference signals. This may be done when forwarding the assigned antenna identities to the base station 20. The coordinating UE device 12 may also inform the other UE devices 10, 14 in the beamforming group of the scheme to be used.

When the UE devices 10, 12, 14 in the beamforming group have received the corresponding precoding information for the respective antennas 30-1, 30-2, they may commence group beamforming transmissions. This may occur collectively if the precoding vector contains precoding information for all transmit antennas 30-1, 30-2 of the beamforming group. When the beamforming training packets are sent from the UE devices 10, 12, 14 in a time-multiplexed manner, those UE devices 10, 12, 14 that have received and implemented the respective precoding vector may commence group beamforming transmissions before other members of the beamforming group. The remaining members of the beamforming group may contribute to the group transmissions without beamforming, i.e. using only one transmit antenna, until the sounding reference signals has been transmitted and the beamforming feedback received from the base station 20 in the form of a precoding vector.

The beamforming group of UE devices 10, 12, 14 may be a sub-group of a larger group of devices configured for group transmission. The larger group may be established by manually connecting the devices to each other by means of an application downloaded by the user. Obviously, each UE device 10, 12, 14 in a beamforming group must have at least two active transmit antennas.

In order to be recognised as a single UE device, the beamforming group is assigned a single group identifier for use by the group. The group identifier may take the form of an International Mobile Subscriber Identity (IMSI) that is not associated with any specific device or Subscriber Identity Module (SIM). The group identifier may be assigned by the network in response to a request by a UE device requiring to establish a group for group transmissions. A node in the radio access network or core network, such as the Mobility Management Entity/Home Subscriber Server (MME/HSS) in the case of an LTE network or the base station itself 20 or a radio network controller in the case of a UMTS, or any other network node may allocate a group identifier to the group of UE devices.

This group identifier may be used by the coordinating UE device 12 when establishing a connection with the base station 20 in the conventional manner, but for the group transmission. The uplink resources that can be used for the group transmission are assigned to the group in the same way as to a single UE device.

When the beamforming group is a sub-group of a larger group of devices established for group transmission, the beamforming group can use the same group identifier as the larger group.

FIGS. 4 to 6 are flow diagrams depicting operations which may be taken by UE devices to enable group beamforming transmissions towards a base station or a radio access network. In these flow diagrams, those operations which are illustrated with an uninterrupted are comprised in the broadest example embodiment. Operations depicted within dashed lines represent additional embodiments that may be carried out in addition to the broadest example embodiment.

Turning to the flow diagram of FIG. 4, this commences at step S1 at which the transmit antennas of all UE devices making up a beamforming group are assigned unique identifiers. At step S2, the antenna identifiers are communicated to the base station 20. The base station 20 may also be sent information on what sounding reference scheme is to be used, and in the case of a multiplexed sounding reference scheme defines the convention used to map a sounding reference to each identified transmit antenna. At step S3, each UE device of the beamforming group transmits a sounding reference signal (beamforming training signal) to the base station via the identified antennas. At step S4, each UE device receives beamforming precoding information from the base station 20. At step S5, the UE devices in the beamforming group utilise the respective beamforming precoding information to send a joint beamforming transmission to the base station 20 together with the other UE devices in the beamforming group.

FIG. 5 is a flow diagram illustration the steps performed by a UE device acting as a group coordinator, i.e. UE device 12. At step S10, the UE device may select other UE devices that form part of a beamforming group. The UE devices forming part of the beamforming group are preferably selected on the basis of a good network connection. A selection may be made using information on the downlink signal strength received by each UE device 10, 12, 14. Preferably the beamforming group coordinator 12 determines which UE devices 10, 12, 14 should form part of the beamforming group on the basis of downlink channel measurements from the respective UE devices, 10,14 that are signalled to the beamforming group coordinator 12. An alternative or additional factor for selecting which UE devices should comprise the beamforming group is the proximity to the UE device 10, 12, 14 having data for transmission. Thus the criteria for joining the beamforming group is whether an individual UE device is within a maximum allowable angular spread towards the base station 20. The composition of the group may change depending on the location of the transmitting UE device and when the transmitting UE device changes.

At step S20, the coordinating device determines the number of transmit antennas comprised in the beamforming group. This may be achieved by querying each member of the beamforming group and receiving the relevant information from each UE device. Alternatively, the coordinating device could assume that each device may use a specific number of transmit antennas, for example, 2. At step S30, the coordinating UE device 12 assigns a unique identifier to each transmit antenna comprised in the group. In other words, the antenna identifiers are unique within the group and serve to distinguish between the different antennas of the group. The antenna identifiers may be antenna port numbers. At step S40, the coordinating UE device 12 communicates the respective antenna identifiers to each of the other UE devices of the beamforming group. All antenna identifiers are also sent to the base station 20. As with all communication with the base station 20, this information can be associated with a group identifier. The base station thus views the multiple antennas identified by the coordinating UE device as belonging to a single UE device. The coordinating device may also inform the base station 20 of the sounding reference scheme that is to be used, unless this is predetermined.

At step S50, the coordinating UE device 12 then sends the sounding reference signal to the base station on the identified antennas. This signal may be sent as part of a multiplexed sounding reference signal using the same SRS symbol and frequency bandwidth as other member of the beamforming group. At step S60, the coordinating UE device receives a precoding vector from the base station to use in adjusting the phase and/or magnitude of antenna signals in order to create an optimal directional beam for transmissions towards the base station 20. This may be a combined precoding vector including data for all devices in the beamforming group. In this case, at step S70, the coordinating UE device 12 also sends the relevant precoding information to each of the other UE devices. At step S80, the coordinating UE device 12 uses the precoding data to send data jointly with other devices of the group in a group beamforming transmission.

If the sounding reference scheme utilized is time-multiplexed, the coordinating UE device 12 performs steps S31 and S41 in addition to steps S3 and S4. More specifically, after, or in combination with, step S3, the coordinating UE device assigns time slots for each member of the beamforming group to send sounding reference signals to the base station at step S31. After or in combination with step S4, the coordinating UE device communicates the relevant time slot to each of the other UE devices in the group at step S41. As each UE device in the beamforming group sends a sounding reference signal separately in its assigned time slot, the coordinating UE device 12 sends this at step S5. If the precoding vectors are received by each UE device directly, the precoding vector sent by the base station 20 at step S6 is sent in reply to the sounding reference signal from the coordinating UE device 12 in the designated time slot. The coordinating UE device 12 may also receive the precoding vectors relating to the remaining UE devices in the group, in which case at step S7 the coordinating UE device transmits the precoding vector directly to the relevant UE device. Once the coordinating UE device 12 has received precoding information for its own transmit antennas 30-1, 30-2, it may participate at step S8 in a joint beamforming group transmission to transmit the same data as other UE devices that have also received the relevant precoding data. Step S7 is repeated until all UE devices have received corresponding precoding data from the base station (S9) whereupon the beamforming group is complete.

The transmission of the sounding reference signal and receipt of precoding information from the base station may be performed periodically by all UE devices in the beamforming group to ensure optimal beamforming even as the UE devices change location.

FIG. 6 shows the process performed in UE devices 10, 14 that are part of the beamforming group but that are not coordinating UE devices. At step S100 the UE device receives antenna identifiers for each transmit antenna in the device from a group coordinating UE device 12. The UE device may also receive a time slot for transmitting a sounding reference signal at step S110 if the beamforming training scheme is time-multiplexed for members of the beamforming group. At step S120 the UE device transmits the sounding reference signal to the base station with the antenna identifiers, for example on assigned antenna port numbers. For a time-multiplexed SRS scheme, this step is performed in the designated time slot. Otherwise, the sounding reference signal from the UE device is sent simultaneously with that of the other UE devices of the beamforming group as part of a multiplexed signal using the same sounding reference symbol and frequency band. At step S130, the UE device receives a precoding vector relating to the assigned antenna identifiers either directly from the base station 20 or via the coordinating UE device 12. At step S140, the UE device uses the precoding data to send data jointly with other UE devices of the beamforming group as part of a joint beamforming transmission. The transmitted data may be the same for all devices in which case all US devices transmit the same data is synchronously.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, in a first device, for transmitting data wirelessly to a base station of a mobile telecommunications network, the method comprising:
   assigning a unique antenna identifier to each transmit antenna comprised in devices of a beamforming group, the beamforming group consisting of a plurality of devices including the first device, wherein the beamforming group is assigned a single group identifier for use by the beamforming group;
   communicating the unique antenna identifiers to the other devices of the beamforming group and to the base station, wherein each antenna identifier is unique within the beamforming group and indicated to be associated to the beamforming group with the single group identifier;
   sending a sounding reference signal to the base station with antennas of the first device identified by the antenna identifiers;
   receiving beamforming precoding information from the base station, the beamforming precoding information relating at least to the first device, wherein the precoding information comprises precoding data for the transmit antennas to generate beamforming when performing a group transmission associated with the group identifier;
   utilizing the beamforming precoding information to transmit data to the base station in a beamforming transmission as part of a joint transmission of the data, forming a single beam towards the base station, by a plurality of devices of the beamforming group.

2. The method of claim 1, wherein the sending the sounding reference signal comprises sending the sounding reference signal as part of a multiplexed sounding reference signal sent simultaneously with other devices of the beamforming group.

3. The method of claim 2, wherein the receiving the beamforming precoding information comprises receiving precoding information relating to a plurality of devices of the beamforming group.

4. The method of claim 1:
wherein the sending the sounding reference signal comprises sending the sounding reference signal in a designated time slot; and/or
further comprising transmitting a designated timeslot to each of the other devices of the beamforming group prior to sending the sounding reference signal; and/or
prior to assigning a unique antenna identifier to the transmit antennas of each device of the beamforming group, determining the number of transmit antennas comprised in the devices of the beamforming group; and/or
further comprising establishing the beamforming group prior to assigning antenna identifiers to the transmit antennas; and/or
further comprising communicating with other devices by means of a device-to-device technique used in the mobile telecommunications network.

5. The method of claim 1 further comprising:
establishing the beamforming group prior to assigning antenna identifiers to the transmit antennas;
selecting devices forming part of the beamforming group based on: downlink measurements received from the devices and/or the distance between devices.

6. The method of claim 1, wherein the beamforming group is a sub-group of a larger group of devices established for joint group transmission to the base station.

7. A method, in a device, for transmitting data to a base station of a mobile telecommunications network, the method comprising:
receiving assigned antenna identifiers for transmit antennas comprised in the device from a coordinating device, wherein the device is comprised in a beamforming group, wherein the beamforming group is assigned a single group identifier for use by the beamforming group;
sending a sounding reference signal to the base station with antennas identified by the antenna identifiers, wherein each antenna identifier is unique within the beamforming group and indicated to be associated to the beamforming group with the single group identifier;
receiving beamforming precoding information, wherein the precoding information comprises precoding data for the transmit antennas to generate beamforming when performing a group transmission associated with the group identifier; and
utilizing the beamforming precoding information to transmit data to the base station in a beamforming transmission as part of a joint transmission of the data, forming a single beam towards the base station, by a beamforming group, the beamforming group comprising a plurality of devices including the device and the coordinating device.

8. The method of claim 7:
wherein the sending the sounding reference signal comprises sending the sounding reference signal as part of a multiplexed sounding reference signal sent simultaneously with other devices of the beamforming group; and/or
wherein the sending the sounding reference signal to the base station comprises sending the sounding reference signal in a designated time slot; and/or
further comprising receiving the beamforming precoding information from the coordinating device; and/or
further comprising, prior to receiving the assigned antenna identifiers, communicating the number of transmit antennas comprised in the device to the coordinating device; and/or
further comprising communicating with the coordinating device by means of a device-to-device technique used in the mobile telecommunications network.

9. A first device configured for transmitting data to a base station of a mobile telecommunications network, the device comprising:
processing circuitry;
memory containing instructions executable by the processing circuitry whereby the first device is operative to:
assign a unique antenna identifier to each transmit antenna comprised in devices of a beamforming group, the beamforming group consisting of a plurality of devices including the first device, wherein the beamforming group is assigned a single group identifier for use by the beamforming group;
communicate the unique antenna identifiers to the other devices of the beamforming group and to the base station wherein each antenna identifier is unique within the beamforming group and indicated to be associated to the beamforming group with the single group identifier;
send a sounding reference signal to the base station with the transmit antennas of the first device identified by the antenna identifiers;
receive beamforming precoding information from the base station, the beamforming precoding information relating to at least the first device, wherein the precoding information comprises precoding data for the transmit antennas to generate beamforming when performing a group transmission associated with the group identifier; and
utilize the beamforming precoding information to transmit data to the base station in a beamforming transmission as part of a joint transmission of the data, forming a single beam towards the base station, by the beamforming group.

10. The first device of claim 9, wherein the instructions are such that the first device is operative to:
send the sounding reference signal as part of a multiplexed sounding reference signal sent simultaneously with other devices of the beamforming group; and/or
send the sounding reference signal in a designated time lot; and/or
transmit a designated timeslot to each of the other devices of the beamforming group; and/or
determine the number of antennas comprised in the devices of the beamforming group prior to assigning a unique antenna identifier to the antennas of each device of the beamforming group; and/or
establish the beamforming group prior to assigning antenna identifiers to the antennas, and to send the single group identifier identifying the beamforming group to the other devices of the beamforming group; and/or
select devices forming part of the beamforming group based on downlink measurements received from the devices; and/or communicate with the other devices by means of a device-to-device technique used in the mobile telecommunications network.

11. A device configured for transmitting data to a base station of a mobile telecommunications network, the device comprising:
processing circuitry;
memory containing instructions executable by the processing circuitry whereby the device is operative to:
receive antenna identifiers assigned to transmit antennas comprised in the device from a coordinating device, wherein the device is comprised in a beamforming group comprising a plurality of devices including the device and the coordinating device and wherein the beamforming group is assigned a single group identifier for use by the beamforming group;
send a sounding reference signal to the base station with the transmit antenna of the device identified by the antenna identifiers, wherein each antenna identifier is unique within the beamforming group and indicated to be associated to the beamforming group with the single group identifier;
receive beamforming precoding information, wherein the precoding information comprises precoding data for the transmit antennas to generate beamforming when performing a group transmission associated with the group identifier; and
utilize the beamforming precoding information to transmit data to the base station in a beamforming transmission as part of a joint transmission of the data, forming a single beam towards the base station, by the beamforming group.

12. The device of claim 11, wherein the instructions are such that the device is operative to:
send the sounding reference signal as part of a multiplexed sounding reference signal sent simultaneously with other devices of the beamforming group; and/or
send the sounding reference signal in a designated time slot; and/or
receive the designated timeslot from a coordinating device; and/or
receive the beamforming precoding information from the coordinating device; and/or
communicate the number of transmit antennas comprised in the device to the coordinating device prior to receiving the assigned antenna identifiers for each transmit antenna; and/or
communicate with the coordinating device by means of a device-to-device technique used in the mobile telecommunications network.

* * * * *